March 5, 1940.          P. M. BOURDON          2,192,572
VALVE FOR PNEUMATIC TIRES
Filed April 5, 1938
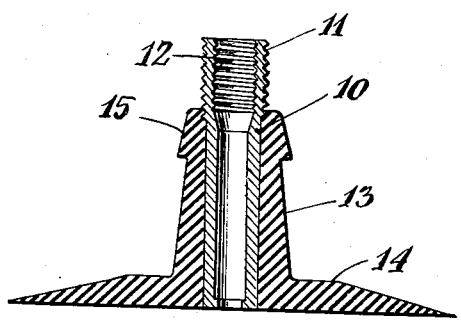
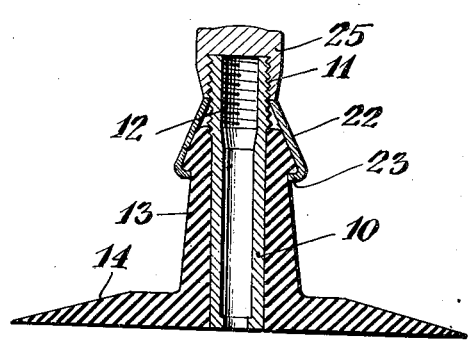
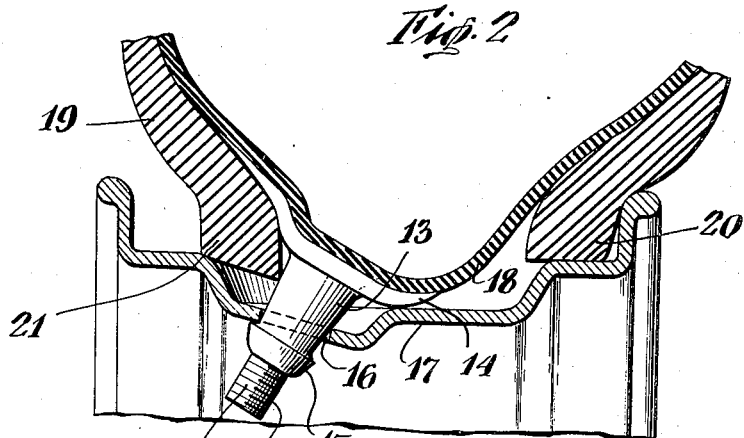
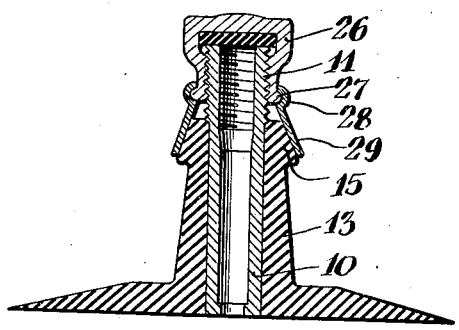
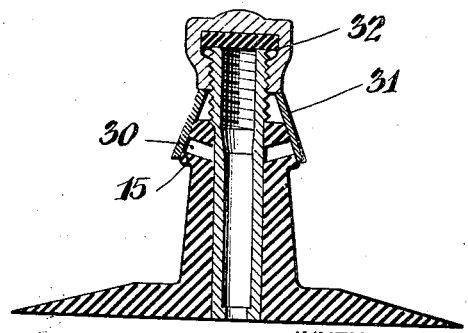
INVENTOR
Pierre Marcel Bourdon
BY
Hoguet, Neary & Campbell
ATTORNEYS Patented Mar. 5, 1940

2,192,572

UNITED STATES PATENT OFFICE 2,192,572

VALVE FOR PNEUMATIC TIRES

Pierre Marcel Bourdon, Paris, France, assignor to Michelin et Cie., Clermont-Ferrand, France, a corporation of France Application April 5, 1938, Serial No. 200,089
In France April 23, 1937

10 Claims. (Cl. 152—430)

This invention relates to valve stem constructions for the tubes of pneumatic tires, and particularly to valve stem constructions including the caps for the same for use in producing balanced tire and wheel constructions.

The valve stems of pneumatic tires are made, in some instances, entirely of metal and are provided with metallic gripping portions which cooperate to seal the valve stem tightly in communication with the tire tube. Such metallic valve stems are heavy and as a consequence normally tend to throw the wheels of motor vehicles out of balance and cause vibration during operation of the vehicle. The metallic valve stems are usually made quite long to reduce their tendency to slip out of the aperture in the wheel rim when the tube is in a deflated condition.

When a tube and a tire casing are applied to the rim the usual procedure consists of placing the assembled but deflated tube and casing in such a position that the valve stem will project through the aperture in the rim. One bead of the casing is slipped onto the rim and the other bead is thereafter forced onto the rim. During the manipulation of the casing the valve stem quite often slips into the interior of the casing from which location it can be removed only with difficulty. In order to overcome the tendency of the valve stem to slip into the tire casing, it is usually necessary to affix a clamping or extension member to the valve stem to retain the valve stem projecting through the rim. This procedure is inconvenient and supplementary tools are needed for properly placing the tire on the rim. Likewise, when a tire is punctured and is run while deflated, the valve stem often slips into the interior of the tire where it damages or destroys the tube.

Valve stem constructions have also been provided which consist of a metallic tube vulcanized into a rubber sleeve projecting from the tire tube. Like the all-metallic valve stems, however, the rubber and metal stems must be long in order to reduce their tendency to slip into the tire casing when the tube is deflated. The excessive length of the valve stem introduces additional weight at one point in the tire tube and thereby throws it out of balance.

Shorter valve stems of lighter weight material would be highly desirable if it were not for the fact that it is difficult with the ordinary type of construction to retain the valve stem projecting properly through the rim when the tire tube is in deflated condition.

An object of the invention, therefore, is to provide a light weight valve construction which cannot be easily drawn into the tire casing when the tube is deflated.

Another object of the invention is to provide a valve stem construction for inner tubes which prevents the valve stem from slipping into the tire casing.

Another object of the invention is to provide a valve stem and valve stem cap construction which is of such light weight that unbalancing of the tire assembly is largely avoided.

Other objects of the invention will become apparent from the disclosure of typical forms of devices embodying the invention.

Generally, valve stem constructions embodying the present invention may include a metallic tube which is much shorter than the tubes commonly used in the production of valve stems. The reduced length of the tube produces a lighter construction and also provides a much shorter valve stem construction than is usual for inner tubes.

In order to overcome the tendency of the valve stem to slip into the interior of the associated tire casing when the tube is deflated, means are provided for resisting extended movement of the valve stem relatively to the rim. This means may consist suitably of a flange or collar which projects from the rubber in which the valve stem tube is seated and which may be of somewhat greater diameter than the diameter of the aperture in the rim. The rubber flange or collar is preferably of such formation that it may be readily forced through the valve stem aperture in the rim but can be withdrawn through the rim only when considerably greater effort is exerted. The preferred form of collar is generally of frusto-conical formation and is arranged with its wider base adjacent the tire tube whereby the edge of the wider base will contact the rim adjacent the aperture when the valve stem is withdrawn partially into the tire casing.

If a vehicle which is provided with tubes having valve stems of the type above described, is driven with a tire completely deflated, greater stresses are exerted which tend to draw the valve stem into the tire casing. As a consequence, the rubber collar might well be distorted sufficiently to allow the stem to slip into the interior of the casing. Distortion of the collar may be prevented, under these circumstances, by a detachable metallic sleeve formed of some light-weight material, such as, for example, aluminum, which maintains the collar in its desired conical form and likewise reinforces it against distortion, thereby preventing the valve stem from slipping in the casing and destroying the tube.

For a better understanding of the present invention, reference may be had to the accompanying drawing in which:

Figure 1 is a cross-sectional view of a valve stem construction embodying the present invention prior to application to a tire tube;

Figure 2 is a sectional view taken through the rim, tube and casing of a typical tire assembly illustrating the position of a valve stem in accordance with the present invention when the tube is deflated and the casing is being applied to the rim;

Figure 3 is a sectional view of a valve stem construction disclosing the one form of valve cap and reinforcing element;

Figure 4 is a view in vertical section of a valve stem having a modified form of valve stem cap and reinforcing member thereon; and Figure 5 is a view in vertical section showing still another type of valve cap and reinforcing construction.

As illustrated in Figure 1, a typical form of valve stem embodying the present invention may consist of a light-weight short metallic tube 10 having threads 11 on its upper end for receiving a valve cap. The valve stem may also be provided with internal threads 12 for receiving a valve core, for example, of the Schrader type. The tube 10 is vulcanized in a sleeve 13 of rubber which has a flaring base portion 14 adapted to be vulcanized to and form a part of a tire tube 18 as shown in Figure 2. The rubber sleeve 13 has at its upper end a collar 15 of conical or frustro-conical shape, the lower edges of which project beyond the periphery of the sleeve 13 and which is of greater transverse dimension than the valve stem aperture 16 in a rim 17, as shown in Figure 2. The sleeve 13 and projecting portion of the metallic tube 10 are of comparatively short over-all length and normally project only a short distance through the rim 17. When the deflated tube 18 and a tire casing 19 are applied to the rim 17 the bead 20 of the casing is forced over the rim and into its proper seating position. The other bead 21 is then forced into its proper seating position but in so doing normally bears against the tire tube 18, tending to tilt the valve stem consisting of tube 10 and rubber sleeve 13 and draw it into the interior of the casing. The collar 15 being of greater diameter than the aperture 16 will strike against the rim 17 adjacent the aperture 16 and prevent the valve stem from slipping into the casing 19. The valve stem is, therefore, readily accessible when it is desired to inflate the tire after application to the rim.

The collar 15 supplies greater resistance to withdrawal of the valve stem into the casing than the normal long valve stem construction without adding an excessive amount of weight to the tire tube. Therefore, it is possible to produce a lighter weight and more accurately balanced tire tube than is possible with the ordinary all-metallic or long stem valve tube construction.

Sometimes tires are run when deflated and there is a tendency for the tire tube to slip relatively to the rim. Slippage of the tire may create sufficient energy to withdraw the valve stem into the tire casing even against the resistance of the collar 15. Therefore, it is desirable to provide a construction which stiffens or reinforces the collar 15 sufficiently to prevent withdrawal of the entire valve stem into the casing. A suitable form of reinforcing device is disclosed in Figure 3 and may consist of a generally frustro-conical shield 22 having inturned flanges 23 at its lower edge. The shield 22 may be forced down over the shoulder or collar 15 until the lower edge of the collar snaps into or over the flange 24. A conventional valve stem cap 25 may then be threaded onto the threads 11 of the valve stem tube and will bear against the upper edge of the shield retaining it in position. The shield 22 is, of course, of greater diameter than either the collar 15 or the aperture 16 in the rim 17 and thereby positively prevents withdrawal of the valve stem into the tire casing.

A modified form of reinforcing member or shield combined with a valve cap is disclosed in Figure 4. In this form of reinforcing element the cap 26 is provided with an outwardly directed flange 27 at its lower edge which is received in an annular depression 28 at the upper end of a conical shield. The flange 27 is rotatable relatively to the shield 29 and therefore can be screwed onto the threads 11 of the tube without rotation of the shield 29. The shield 29 prevents distortion of the collar and thereby prevents the valve stem from slipping into the interior of the tire casing when the tube is deflated.

In Figure 5 is disclosed still another form of reinforcing member and valve cap. In this form of the invention the collar 15 may be provided with angularly directed apertures 30 therein which are sealed at their inner ends and act as suction cups. The reinforcing element with this type of valve stem construction consist of a frustro-conical shield 31 which may be forced down against the collar 15 and retained thereon by the suction created in the apertures 30. A conventional valve stem cap 32 is also provided and may be threaded onto the valve stem tube and brought into engagement with the reinforcing element 31, thereby positively retaining the latter in position to prevent the valve stem from slipping into the tire casing.

The above described constructions are shorter and lighter than other known types of valve stems. Nevertheless, because of the construction of the valve stem, the valve stem cannot slip readily into the interior of the casing and cause damage to the tube. Valve stem constructions embodying my invention can be made inexpensively and at the same time have the advantages pointed out above which are not present in other valve stem constructions.

It will be understood that there can be variations made in the shape of the valve stem, the length of the stem, and the size of the cooperating reinforcing and cap portions without departing from the invention. Therefore, the above described embodiments of the invention should be considered as illustrative only and not as limiting the scope of the following claims.

I claim:

1. A valve stem for inner tubes comprising a rigid tube having a threaded end, a rubber sleeve vulcanized to the rigid tube, terminating short of said threaded end and having a base portion adapted to be attached to an inner tube, and a resilient collar on said sleeve adjacent said threaded end and projecting laterally beyond the sleeve.

2. A valve stem for inner tubes comprising a rubber sleeve adapted to be attached to an inner tube, a rigid tube vulcanized into, extending substantially the length of and having a threaded outer end projecting from said sleeve and a substantially frusto-conical collar at the end of said sleeve adjacent the threaded outer end of said tube.

3. A valve stem construction for reducing the tendency of the valve stem to slip through the aperture in the rim of a vehicle wheel, comprising a rubber sleeve of greater length than the thickness of said rim attached to an inner tube, a rigid tube secured in and having an end adapted to receive a closure cap projecting from said sleeve and a resilient collar of greater transverse dimension than the aperture projecting laterally from the outer end of said sleeve adjacent said end of said tube, whereby the valve stem may be inserted through and removed from the aperture only by distorting the collar and the stem can move axially relative to the rim after insertion therethrough.

4. A valve stem construction for reducing the tendency of the valve stem to slip through the aperture in the rim of a vehicle wheel, comprising a rubber sleeve attached to an inner tube, a rigid tube secured in and having a threaded end projecting from said sleeve, and a substantially frusto-conical resilient collar adjacent the outer end of said sleeve and the threaded end of said tube and having a base of greater diameter than the aperture in the rim.

5. A valve stem and valve cap construction for inner tubes comprising a rubber sleeve adapted to be vulcanized to an inner tube, an externally threaded rigid tube secured in said rubber sleeve, a resilient collar projecting laterally from adjacent the outer end of the sleeve, a rigid shield detachably engaging and rigidifying the resilient collar and an internally threaded valve cap on said rigid tube engaging and retaining the sleeve on said collar.

6. A valve stem and valve cap constructioi for inner tubes comprising a rubber sleeve adapted to be vulcanized to an inner tube, an externally threaded rigid tube secured in said rubber sleeve, an outwardly tapering resilient collar projecting laterally from adjacent the outer end of the sleeve, a complementarily tapered shield detachably engaging and rigidifying the resilient collar and an internally threaded valve cap on said rigid tube engaging and retaining the sleeve on said collar.

7. A valve stem and valve cap construction for inner tubes comprising a rubber sleeve adapted to be vulcanized to an inner tube, an externally threaded rigid tube secured in said rubber sleeve, a frusto-conical resilient collar projecting laterally from adjacent the outer end of the sleeve, a complementary frusto-conical shield detachably engaging and rigidifying the resilient collar and an internally threaded valve cap on said rigid tube engaging and retaining the sleeve on said collar.

8. A valve stem and valve cap construction for inner tubes comprising a rubber sleeve adapted to be vulcanized to an inner tube, an externally threaded rigid tube secured in said rubber sleeve, a frusto-conical resilient collar projecting laterally from adjacent the outer ends of the sleeve, recesses in the side of the collar forming suction cups, a frusto-conical shield detachably retained on the collar by the suction cups and an internally threaded valve cap on said rigid tube engaging and detaining the sleeve on said collar.

9. A valve stem cap comprising an internally threaded substantially cup-shaped member, an outwardly projecting peripheral flange on said member and a frusto-conical shield having an annular groove in its narrower end for receiving the flange and rotatably connecting the member to the shield.

10. A valve stem cap comprising an internally threaded substantially cup-shaped member, a tapered tubular shield and means connecting the member and the shield for relative rotation.

PIERRE MARCEL BOURDON.